United States Patent
Feng et al.

(10) Patent No.: US 9,782,724 B2
(45) Date of Patent: Oct. 10, 2017

(54) REPLENISHING LIQUID MATERIAL TO MEMBRANE

(75) Inventors: Xianshe Feng, Waterloo (CA); Ian Glenn Towe, Caledon (CA); Ali Hamza, Mississauga (CA); Juan Carlos Perez, Brampton (CA)

(73) Assignee: IMTEX MEMBRANES CORP., Mississauga (CA)

( * ) Notice: Subject to any disclaimer, the term of this patent is extended or adjusted under 35 U.S.C. 154(b) by 489 days.

(21) Appl. No.: 14/124,634

(22) PCT Filed: Jun. 7, 2012

(86) PCT No.: PCT/CA2012/000554
§ 371 (c)(1),
(2), (4) Date: Mar. 31, 2014

(87) PCT Pub. No.: WO2013/167362
PCT Pub. Date: Dec. 13, 2012

(65) Prior Publication Data
US 2014/0245884 A1    Sep. 4, 2014

Related U.S. Application Data

(60) Provisional application No. 61/494,204, filed on Jun. 7, 2011.

(51) Int. Cl.
*B01D 53/22* (2006.01)
*B01D 61/38* (2006.01)
(Continued)

(52) U.S. Cl.
CPC .......... *B01D 61/38* (2013.01); *B01D 53/228* (2013.01); *B01D 65/02* (2013.01); *B01D 71/08* (2013.01); *B01D 2321/28* (2013.01)

(58) Field of Classification Search
CPC ...... B01D 53/228; B01D 61/38; B01D 65/02; B01D 71/08; B01D 2321/28
See application file for complete search history.

(56) References Cited

U.S. PATENT DOCUMENTS

| | | | |
|---|---|---|---|
| 3,758,603 A | 9/1973 | Steigelmann et al. | 585/818 |
| 3,758,605 A * | 9/1973 | Hughes | B01D 61/38 208/308 |

(Continued)

FOREIGN PATENT DOCUMENTS

| | | |
|---|---|---|
| CA | 2426629 | 10/2004 |
| CN | 101053737 | 10/2007 |

(Continued)

OTHER PUBLICATIONS

Azhin, et al., "A review on olefin/paraffin separation using reversible chemical complexation technology" J Indus Engin Chem. 14:622-38, 2008.

(Continued)

*Primary Examiner* — Anthony Shumate
(74) *Attorney, Agent, or Firm* — Ridout & Maybee LLP

(57) ABSTRACT

There is provided a process for effecting separation of at least a gaseous permeate-disposed operative material from a gaseous supply material that is being supplied to a gaseous supply material receiving space that is disposed in mass transfer communication with a permeate receiving space through a membrane, the gaseous supply material including an operative material that defines a gaseous supply material-disposed operative material, and the membrane including a gel. The process includes replenishing liquid material that has become depleted from the gel.

70 Claims, 2 Drawing Sheets

(51) Int. Cl.
*B01D 65/02* (2006.01)
*B01D 71/08* (2006.01)

(56) References Cited

U.S. PATENT DOCUMENTS

| | | | | |
|---|---|---|---|---|
| 3,844,735 A * | 10/1974 | Steigelmann | ........ | B01D 53/228 95/44 |
| 3,896,061 A * | 7/1975 | Tanzawa | ........ | B01D 69/08 264/49 |
| 3,962,158 A * | 6/1976 | Mima | ........ | B01D 71/08 210/500.42 |
| 4,257,798 A * | 3/1981 | Hendricks | ........ | C03B 19/1065 264/43 |
| 4,710,205 A * | 12/1987 | Deetz | ........ | B01D 61/38 96/5 |
| 4,750,918 A | 6/1988 | Sirkar | ........ | 95/44 |
| 4,961,758 A * | 10/1990 | Dobitz | ........ | B01D 61/38 585/818 |
| 5,057,641 A | 10/1991 | Valus et al. | ........ | 585/818 |
| 5,135,547 A * | 8/1992 | Tsou | ........ | B01D 53/22 585/819 |
| 5,344,543 A * | 9/1994 | Boquet | ........ | B01D 57/02 204/620 |
| 5,670,051 A | 9/1997 | Pinnau et al. | ........ | 210/651 |
| 6,152,121 A * | 11/2000 | Tolman | ........ | F02M 25/10 123/1 A |
| 6,192,633 B1 * | 2/2001 | Hilbert | ........ | E04H 1/1277 52/2.18 |
| 6,413,298 B1 * | 7/2002 | Wnek | ........ | B01D 53/228 95/52 |
| 6,468,219 B1 * | 10/2002 | Njemanze | ........ | A61B 5/0031 600/454 |
| 6,558,537 B1 * | 5/2003 | Herrington | ........ | B01D 61/04 205/747 |
| 6,569,387 B1 * | 5/2003 | Furner | ........ | A01M 1/2033 222/183 |
| 6,630,067 B2 * | 10/2003 | Shieh | ........ | C02F 3/301 119/227 |
| 6,780,307 B2 * | 8/2004 | Kidwell | ........ | G01N 33/48714 204/415 |
| 7,014,770 B2 * | 3/2006 | Umezawa | ........ | B01D 61/16 205/500 |
| 7,303,676 B2 * | 12/2007 | Husain | ........ | B01D 69/084 210/615 |
| 7,361,800 B2 | 4/2008 | Herrera et al. | ........ | 585/818 |
| 7,566,385 B2 * | 7/2009 | Mazur | ........ | B23H 5/08 204/224 M |
| 7,625,427 B2 * | 12/2009 | Clarke | ........ | A61M 16/22 128/205.28 |
| 7,846,318 B2 * | 12/2010 | Pratt | ........ | A61K 8/26 204/523 |
| 8,764,888 B2 * | 7/2014 | Ophir | ........ | B01D 61/362 128/205.27 |
| 8,784,389 B2 * | 7/2014 | Stern | ........ | A61M 39/0208 604/23 |
| 9,090,766 B2 * | 7/2015 | Rakhman | ........ | B01D 53/268 |
| 2002/0148779 A1 * | 10/2002 | Shieh | ........ | C02F 3/301 210/605 |
| 2003/0034304 A1 | 2/2003 | Huang | ........ | 210/640 |
| 2004/0104166 A1 * | 6/2004 | Tessier | ........ | B01D 61/48 210/499 |
| 2004/0215045 A1 | 10/2004 | Herrera et al. | ........ | 585/818 |
| 2007/0238835 A1 * | 10/2007 | Chen | ........ | C08L 53/02 525/240 |
| 2008/0302725 A1 | 12/2008 | Feng | ........ | 210/660 |
| 2011/0003236 A1 * | 1/2011 | Song | ........ | H01M 8/04276 429/500 |
| 2011/0143232 A1 * | 6/2011 | Burban | ........ | B01D 53/228 429/414 |
| 2015/0233589 A1 * | 8/2015 | Betts | ........ | F24F 3/147 203/23 |
| 2015/0329901 A1 * | 11/2015 | Alvarez, Jr. | ........ | C12Q 1/6848 422/28 |

FOREIGN PATENT DOCUMENTS

| | | |
|---|---|---|
| EP | 0458598 | 5/1991 |
| EP | 0 456 598 | 11/1991 |
| GB | 1 431 946 | 4/1976 |
| JP | S49-048603 | 5/1974 |
| JP | H04-227823 | 8/1992 |
| JP | H06-091130 | 4/1994 |
| JP | 2007-105683 | 4/2007 |
| JP | 2007-203280 | 8/2007 |

OTHER PUBLICATIONS

Teramoto, et al., "Separation of ethylene from ethane by a flowing liquid membrane using silver nitrate as a carrier" J Membrane Sci. 45:115-36, 1989.

Search Report and Written Opinion in International Application No. PCT/CA2012/000554 mailed Sep. 13, 2012, 9 pgs.

Office Action issued in Russian Patent Application No. 2013157902-05(090197), dated May 13, 2016. (English Translation Provided).

Office Action issued in Japanese Patent Application No. 2014-513868, dated Apr. 5, 2016. (English Translation Provided), 10 pgs.

Office Action issued in Chinese Patent Application No. 2012800385179, dated Mar. 3, 2015. (English Translation Provided), 21 pgs.

English Translation of Office Action issued in Israeli Patent Application No. 229809, dated Oct. 12, 2015, 3 pgs.

Office Action issued in European Application No. 12797176.0, dated Oct. 21, 2014, 1 pgs.

Office Action for Russian Application No. 2013157902 dated Sep. 13, 2016 (English translation provided).

Patent Examination Report No. 1 for Australian Application No. 2012267170 dated Sep. 13, 2016.

Official Notice of Final Decision of Rejection for Japanese Patent Application No. 2014-513868 mailed Mar. 7, 2017.

Office Action issued in Israeli Patent Application No. 229809, dated Mar. 26, 2017.

* cited by examiner

REPLENISHING LIQUID MATERIAL TO MEMBRANE

RELATED APPLICATION

This application is a national phase application under 35 U.S.C. §371 of International Application No. PCT/CA2012/000554 filed Jun. 7, 2012, which claims the benefits of priority to U.S. Provisional Patent Application Ser. No. 61/494,204, filed on Jun. 7, 2011. The entire contents of each of the above-referenced disclosures is specifically incorporated herein by reference without disclaimer.

FIELD

This relates to improving the performance of permeation processes.

BACKGROUND

Membrane-based separation has proved to be an efficient technology for gaseous separations. Some of the mechanisms for facilitating selective permeation of material through the membrane involve bonding with a carrier that is dissolved within a solution disposed within the membrane polymer matrix. This carrier forms a reversible complex with at least one component of a given mixture and thus enables enhanced transport across the membrane. During operation, the liquid media within the membrane polymer matrix becomes depleted, which affects membrane separation performance.

SUMMARY

In one aspect, there is provided a process for effecting separation of at least a gaseous permeate-disposed operative material from a gaseous supply material that is being supplied to a gaseous supply material receiving space that is disposed in mass transfer communication with a permeate receiving space through a membrane, the gaseous supply material including an operative material that defines a gaseous supply material-disposed operative material, and the membrane including a gel, comprising:
supplying the gaseous supply material to the gaseous supply material receiving space, and while the supplying of the gaseous supply material to the gaseous supply material receiving space is being effected, effecting permeation of at least a separation fraction of the gaseous supply material-disposed operative material from the gaseous supply material receiving space, through the membrane, and into the permeate receiving space, wherein the permeation of at least a separation fraction of the gaseous supply material-disposed operative material to the permeate receiving space effects production of the gaseous permeate-disposed operative material, and wherein the permeation is effected in response to a differential in chemical potential of the operative material, as between the gaseous supply material receiving space and the permeate receiving space, and wherein the permeation includes transporting of a carrier-transported fraction of the gaseous supply material-disposed operative material through the membrane, wherein the carrier-transported fraction of the gaseous supply material-disposed operative material is defined by at least a fraction of the at least a separation fraction of the gaseous supply material-disposed operative material, and while the at least a carrier-transported fraction of the gaseous supply material-disposed operative material is being transported through the membrane and towards the permeate receiving space, and during at least a fraction of the transporting of the at least a carrier-transported fraction of the gaseous supply material-disposed operative material through the membrane and towards the permeate receiving space, the at least a carrier-transported fraction of the gaseous supply material-disposed operative material is associated with a carrier material that is dissolved within a liquid material that is disposed within the membrane gel; and
effecting contacting of the membrane with a replenishment liquid material, wherein the replenishment liquid material includes a replenishment liquid material-disposed carrier material that is dissolved within replenishment liquid material-disposed liquid material, wherein the replenishment liquid material-disposed liquid material of the replenishment liquid material defines liquid material of the replenishment liquid material, and wherein the replenishment liquid material-disposed carrier material that is dissolved within the replenishment liquid material-disposed liquid material defines dissolved carrier material of the replenishment liquid material, such that, in response to the contacting of the membrane with the replenishment liquid material, at least a fraction of the replenishment liquid material becomes disposed within the membrane gel.

In another aspect, there is provided a process for effecting separation of at least a gaseous permeate-disposed operative material from a gaseous supply material that is being supplied to a gaseous supply material receiving space that is disposed in mass transfer communication with a permeate receiving space through a membrane, the gaseous supply material including an operative material that defines a gaseous supply material-disposed operative material, and wherein the membrane includes a gel, comprising:
while supplying the gaseous supply material to the gaseous supply material receiving space and effecting permeation of at least a separation fraction of the gaseous supply material-disposed operative material from the gaseous supply material receiving space, through the membrane, and into the permeate receiving space, wherein the permeation of at least a separation fraction of the gaseous supply material-disposed operative material to the permeate receiving space effects production of the gaseous permeate-disposed operative material, and wherein the permeation is effected in response to a differential in chemical potential of the operative material, as between the gaseous supply material receiving space and the permeate receiving space, and wherein the permeation includes transporting of a carrier-transported fraction of the gaseous supply material-disposed operative material through the membrane, wherein the carrier-transported fraction of the gaseous supply material-disposed operative material is defined by at least a fraction of the at least a separation fraction of the gaseous supply material-disposed operative material, and while the at least a carrier-transported fraction of the gaseous supply material-disposed operative material is being transported through the membrane and towards the permeate receiving space, and during at least a fraction of the transporting of the at least a carrier-transported fraction of the gaseous supply material-disposed operative material through the membrane and towards the permeate receiving space, the at least a carrier-transported fraction of the gaseous supply material-disposed operative material is associated with a carrier material that is dissolved within a liquid material that is disposed within the membrane gel, periodically, effecting contacting of the membrane with a replenishment liquid material, wherein the replenishment liquid material includes a replenishment liquid material-disposed carrier material that is dissolved within replenishment liquid material-disposed liquid material, wherein the replenishment liquid material-disposed liquid material of the replenishment liquid material defines liquid material of the replenishment liquid material, and wherein the replenishment liquid material-disposed carrier material which is dissolved within the replenishment liquid material-disposed liquid material defines dissolved carrier material of the replenishment liquid material, such that, in response to the contacting of the membrane with the replenishment liquid material, at least a fraction of the replenishment liquid material becomes disposed within the membrane gel.

In another aspect, there is provided a process for effecting separation of at least a gaseous permeate-disposed operative material from a gaseous supply material that is being supplied to a gaseous supply material receiving space that is disposed in mass transfer communication with a permeate receiving space through a membrane, the gaseous supply material including an operative material that defines a gaseous supply material-disposed operative material, and wherein the membrane includes a gel, comprising a repeating set of steps, the repeating set of steps comprising:

supplying the gaseous supply material to the gaseous supply material receiving space and, while the supplying of the gaseous supply material to the gaseous supply material receiving space is being effected, effecting permeation of at least a separation fraction of the gaseous supply material-disposed operative material from the gaseous supply material receiving space, through the membrane, and into the permeate receiving space, wherein the permeation of at least a separation fraction of the gaseous supply material-disposed operative material to the permeate receiving space effects production of the gaseous permeate-disposed operative material, and wherein the permeation is effected in response to a differential in partial pressure of the operative material, as between the gaseous supply material receiving space and the permeate receiving space, and wherein the permeation includes transporting of a carrier-transported fraction of the gaseous supply material-disposed operative material through the membrane, wherein the carrier-transported fraction of the gaseous supply material-disposed operative material is defined by at least a fraction of the at least a separation fraction of the gaseous supply material-disposed operative material, and while the at least a carrier-transported fraction of the gaseous supply material-disposed operative material is being transported through the membrane and towards the permeate receiving space, and during at least a fraction of the transporting of the at least a carrier-transported fraction of the gaseous supply material-disposed operative material through the membrane and towards the permeate receiving space, the at least a carrier-transported fraction of the gaseous supply material-disposed operative material is associated with a carrier material that is dissolved within a liquid material that is disposed within the membrane gel;

suspending the supplying of the gaseous supply material to the gaseous supply material receiving space;

after the suspension of the supplying of the gaseous supply material has been effected, effecting contacting of the membrane with a replenishment liquid material, wherein the replenishment liquid material includes a replenishment liquid material-disposed carrier material that is dissolved within replenishment liquid material-disposed liquid material, wherein the replenishment liquid material-disposed liquid material of the replenishment liquid material defines liquid material of the replenishment liquid material, and wherein the replenishment liquid material-disposed carrier material that is dissolved within the replenishment liquid material-disposed liquid material defines dissolved carrier material of the replenishment liquid material, such that, in response to the contacting of the membrane with the replenishment liquid material, at least a fraction of the replenishment liquid material becomes disposed within the membrane gel; and suspending the effecting of the contacting of the membrane with a replenishment liquid material.

BRIEF DESCRIPTION OF DRAWING

The preferred embodiments will now be described with the following accompanying drawings.

DETAILED DESCRIPTION

Figure 1:
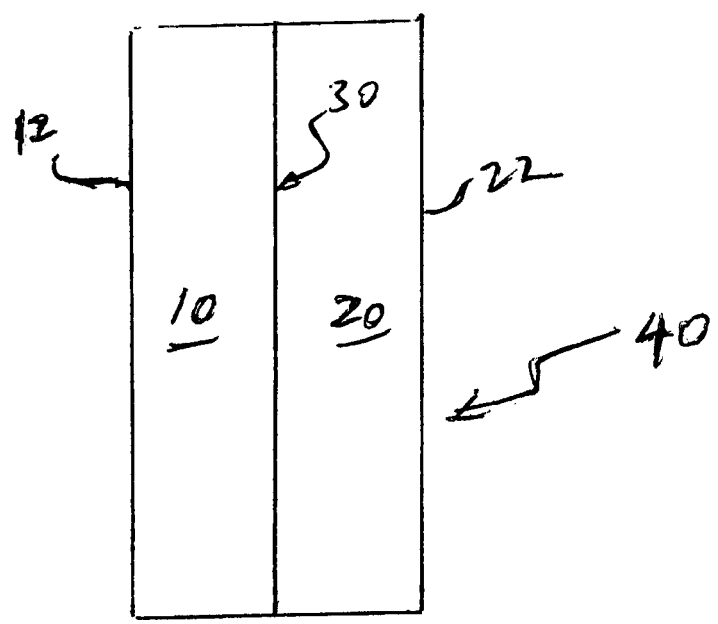
FIG. 1 is a schematic illustration of an embodiment of a system in which is practised an embodiment of the process.

Unless stated otherwise, such as in the examples, all amounts and numbers used in this specification are intended to be interpreted as modified by the term 'about'. Likewise, all compounds or elements identified in this specification, unless stated otherwise, are intended to be non-limiting and representative of other compounds or elements generally considered by those skilled in the art as being within the same family of compounds or elements.

The term "associated" and grammatical variations thereof include any type of interaction, including chemical bonds (for example, covalent, ionic and hydrogen bonds) and/or Van der Waals forces, and/or polar and non-polar interactions through other physical constraints provided by molecular structure, and interactions through physical mixing.

In one aspect, there is provided a process for effecting separation of at least a gaseous permeate-disposed operative material from a gaseous supply material that is being supplied to a gaseous supply material receiving space 10 that is disposed in mass transfer communication with a permeate receiving space 20 through a membrane 30. The gaseous supply material includes an operative material that defines a gaseous supply material-disposed operative material. The membrane includes a gel (a "membrane gel").

The process includes, supplying the gaseous supply material to the gaseous supply material receiving space 10, and while the supplying of the gaseous supply material to the gaseous supply material receiving space 10 is being effected, effecting transfer (or permeation) of at least a fraction of the gaseous supply material-disposed operative material (hereinafter, such fraction being referred to as a "separation fraction") from the gaseous supply material receiving space 10, through the membrane 30, and into the permeate receiving space 20. The transfer (or "permeation") of at least a separation fraction of the gaseous supply material-disposed operative material to the permeate receiving space effects production of the gaseous permeate-disposed operative material. The transfer (or "permeation") is effected in response to a differential in chemical potential of the operative material, as between the gaseous supply material receiving space and the permeate receiving space. In this respect, while the transfer (or "permeation") is being effected, the chemical potential of the operative material disposed in the gaseous supply material receiving space (i.e. the gaseous supply material receiving space-disposed operative material) is greater than the chemical potential of the operative material disposed within the permeate receiving space (i.e. the permeate receiving space-disposed operative material). In some embodiments, for example, the chemical potential is defined by partial pressure, such that the transfer (or "permeation") is effected in response to a differential in partial pressure of the operative material, as between the gaseous supply material receiving space and the permeate receiving space. In this respect, while the transfer (or "permeation") is being effected, the partial pressure of the operative material disposed in the gaseous supply material receiving space (i.e. the gaseous supply material receiving space-disposed operative material) is greater than the partial pressure of the operative material disposed within the permeate receiving space (i.e. the permeate receiving space-disposed operative material).

The effecting of the transfer (or "permeation") of at least a separation fraction of the gaseous supply material-disposed operative material to the permeate receiving space 20 includes effecting contacting of, or interaction between, at least a carrier-transported fraction of the gaseous supply material-disposed operative material and a carrier material that is dissolved within a liquid material that is disposed within the membrane gel, so as to effect association between the at least a carrier-transported fraction and the carrier material. The at least a carrier-transported fraction of the gaseous supply material-disposed operative material is defined by at least a fraction of the at least a separation fraction of the gaseous supply material-disposed operative material. A fraction of the operative material-derived material is derived from the gaseous supply material-disposed operative material, and the operative material-derived material includes the at least a carrier-transported fraction of the gaseous supply material-disposed operative material, and such that the at least a carrier-transported fraction of the gaseous supply material-disposed operative material is disposed as a fraction of the operative material-derived material within the membrane 30. It is believed that, in some embodiments, in response to the contacting of or interaction between, the at least a separation fraction of the gaseous supply material-disposed operative material and a carrier material, a reversible chemical reaction is effected between the at least a separation fraction of the gaseous supply material-disposed operative material and the carrier material, so as to effect production of the operative material-derived material. In those embodiments where the operative material includes an olefin and the carrier material includes a silver ion dissolved in an aqueous solution that is included with the membrane gel, a reactive process is effected such that the olefin becomes chemically modified by bonding with the silver ion through π-complexation.

Because of the difference in chemical potential of the operative material, as between the gaseous supply material receiving space and the permeate receiving space, the concentration of the at least a carrier-transported fraction of the gaseous supply material-disposed operative material within that portion of the membrane proximate to the gaseous supply material receiving space 10 is greater than the concentration of the at least a carrier-transported fraction of the gaseous supply material-disposed operative material within that portion of the membrane proximate to the permeate receiving space 20, and thereby effects a driving force for the transport.

While the at least a carrier-transported fraction of the gaseous supply material-disposed operative material (as defined by at least a fraction of the at least a separation fraction of the gaseous supply material-disposed operative material) is being transported through the membrane 30 and towards the permeate receiving space 20, and during at least a fraction of (or, at least some of) the transporting of the at least a carrier-transported fraction of the gaseous supply material-disposed operative material through the membrane 30 and towards the permeate receiving space 20, the at least a carrier-transported fraction of the gaseous supply material-disposed operative material is associated with the carrier material. In some embodiments, for example, the association is one of chemical bonding. In this respect, in those embodiments where the operative material includes an olefin and the carrier material includes a silver ion dissolved in an aqueous solution that is included with the membrane gel, the association between the at least a carrier transported fraction of the olefin and the silver ion is one of chemical bonding through π-complexation.

It is believed that, in some embodiments, the transporting of the at least a carrier transported fraction of the gaseous supply material-disposed operative material across the membrane 30 and towards the permeate receiving space 20 includes that effected by the transporting of an operative material-derived material across the membrane 30 and towards the permeate receiving space 20. The operative material-derived material is produced by contacting of the at least a carrier transported fraction of the gaseous supply material-disposed operative material with the carrier material. In this respect, in some embodiments, the transporting of the operative material-derived material across the membrane 30 and towards the permeate receiving space 20 is facilitated by mobility of the operative material-derived material within the membrane 30. In some of these embodiments, for example, the transporting of the operative material-derived material across the membrane 30 and towards the permeate receiving space 20 is facilitated by mobility of the operative material-derived material within the liquid material of the membrane gel.

It is also believed that, in some embodiments, the transporting of the at least a carrier transported fraction of the gaseous supply material-disposed operative material across the membrane 30 and towards the permeate receiving space 20 includes that effected by "hopping" of the at least a carrier transported fraction of the gaseous supply material-disposed operative material from association with one carrier material to the next until reaching the permeate receiving space 20.

It is also believed that, in some embodiments, the transporting of the at least a carrier transported fraction of the gaseous supply material-disposed operative material across the membrane 30 and towards the permeate receiving space 20 includes that effected by a combination of both of the above-described transport mechanisms.

In some embodiments, for example, while the transfer (or "permeation") of at least a separation fraction of the gaseous supply material-disposed operative material to the permeate receiving space 20 is being effected, a gaseous operative material-depleted residue is discharged from the gaseous supply material receiving space. The molar concentration of the operative material within the gaseous supply material, which is being supplied, is greater than the molar concentration of the operative material within the gaseous operative material-depleted residue, which is being discharged.

In some embodiments, for example, while the transfer (or "permeation") of at least a separation fraction of the gaseous supply material-disposed operative material to the permeate receiving space 20 is being effected, a gaseous operative material-depleted residue is discharged from the gaseous supply material receiving space, and a gaseous permeate product, including the gaseous permeate-disposed operative material, is discharged from the permeate receiving space. The molar concentration of the operative material within the gaseous supply material, which is being supplied, is greater than the molar concentration of the operative material within the gaseous operative material-depleted residue, which is being discharged. The molar concentration of the operative material within the gaseous permeate product, which is being discharged, is greater than the molar concentration of the operative material within the gaseous supply material, which is being supplied.

The process further includes effecting contacting of the membrane 30 with a replenishment liquid material. The replenishment liquid material includes a replenishment liquid material-disposed carrier material that is dissolved within replenishment liquid material-disposed liquid material. The replenishment liquid material-disposed liquid material of the replenishment liquid material defines liquid material of the replenishment liquid material. The replenishment liquid material-disposed carrier material that is dissolved within the replenishment liquid material-disposed liquid material defines dissolved carrier material of the replenishment liquid material. In response to the contacting of the membrane with the replenishment liquid material, at least a fraction of the replenishment liquid material becomes disposed within the membrane. Also, in this respect, any liquid material that has become depleted, during the transferring of at least a fraction of the gaseous supply material-disposed operative material, is at least partially replenished by virtue of the effecting of the disposition of the replenishment liquid material (which includes the liquid material) within the membrane. In some embodiments, for example, liquid material, within the membrane, is depleted during the transferring of at least a fraction of the gaseous supply material-disposed operative material, and the contacting of the membrane with the replenishment liquid material effects at least partial replenishment of the liquid material within the membrane gel.

Such replenishment is desirable as liquid material is depleted due to mass transfer from the membrane 30 into both of the gaseous supply material receiving space 10 and the permeate receiving space 20. The rate and extent of liquid material depletion depends on operating conditions, such as operating temperatures and pressures, rate of material flow through the gaseous supply material receiving space, and rate of discharge of permeate product from the permeate receiving space, and also on the water content within each one of the gaseous supply material receiving space and the permeate receiving space. Maintaining a minimum concentration of liquid material within the membrane assists in effecting continuous separation and permeation as a desirable mobility of the operative material-derived material is facilitated while a desirable structural integrity of the membrane is maintained. Complete depletion of liquid material may lead to uneven stresses, fractures or pinholes that would compromise performance. By including carrier material within the replenishment liquid material, stripping of the carrier material from the membrane, during the contacting of the membrane with the replenishment liquid material, is mitigated.

In some embodiments, for example, the effecting of the contacting of the membrane with a replenishment liquid material is effected after at least a fraction of the liquid material, which is disposed within the membrane gel, becomes depleted. In some embodiments, for example, the effecting of the contacting of the membrane with a replenishment liquid material is effected in response to sensing that at least a fraction of the liquid material, which is disposed within the membrane gel, becomes depleted.

In some embodiments, for example, the contacting of the replenishment liquid material is effected at predetermined time intervals determined by several factors, where the anticipated impact of those factors is determined by experimental data. These factors include the volume of gas passed through the membrane, operating temperature, pressure differential, thickness of chitosan membrane, molarity of the hydration solution, characteristics of substrate, etc. (some of these are of course dependent on each other). The experiments would have revealed the onset time of changes in membrane permeability, membrane selectivity or both at a given combination of operating conditions and membrane composition due to dehydration of the membrane. The liquid material is replenished at appropriate intervals to maintain steady performance and/or protect membrane integrity.

In some embodiments, for example, the effecting of the contacting of the membrane with a replenishment liquid material is effected while the supplying of the gaseous supply material to the gaseous supply material receiving space is being effected. In some of these embodiments, the effecting of the contacting of the membrane with a replenishment liquid material is periodic, such that the minimum concentration of dissolved carrier material within the replenishment liquid material being supplied during at least one of the periods is greater than the maximum concentration of dissolved carrier material within the replenishment liquid material being supplied during at least another one of the periods. In some embodiments, for example, the minimum concentration of dissolved carrier material within the replenishment liquid material being supplied during at least one of the periods is greater than the maximum concentration of dissolved carrier material within the replenishment liquid material being supplied during at least another one of the periods by a multiple of between 1.05 and 2.0. In some implementations, it is desirable that a replenishment liquid material, that is more dilute in the dissolved carrier material, be supplied during at least one of the periods in order to promote dissolution of any carrier material that may have precipitated onto the membrane 30 during the process.

In some embodiments, for example, the effecting of the contacting of the membrane with a replenishment liquid material is effected after the supplying of the gaseous supply material to the gaseous supply material receiving space has been suspended. In some of these embodiments, for example, the process further includes suspending the effecting of the contacting of the membrane with a replenishment liquid material such that a first liquid replenishment time interval is completed. After the effecting of the contacting of the membrane with a replenishment liquid material has been suspended, resumption of the supplying of the gaseous supply material to the gaseous supply material receiving space is effected such that, while the resumed supplying of the gaseous supply material to the gaseous supply material receiving space is being effected, the permeation of at least a separation fraction of the gaseous supply material-disposed operative material from the gaseous supply material receiving space, through the membrane, and into the permeate receiving space is effected. Subsequently, the resumed supplying of the gaseous supply material to the gaseous supply material receiving space is suspended. After the suspending of the resumed supplying of the gaseous supply material to the gaseous supply material receiving space, resumption of the effecting of the contacting of the membrane with a replenishment liquid material is effected such that a second liquid replenishment time interval during which the effecting of the contacting of the membrane with a replenishment liquid material is being effected. In some of these embodiments, for example, the minimum concentration of dissolved carrier material within the replenishment liquid material being supplied during one of the first and second liquid replenishment time intervals is greater than the maximum concentration of dissolved carrier material within the replenishment liquid material being supplied during the other one of the first and second liquid replenishment time intervals. In some embodiments, for example, the minimum concentration of dissolved carrier material within the replenishment liquid material being supplied during one of the first and second liquid replenishment time intervals is greater than the maximum concentration of dissolved carrier material within the replenishment liquid material being supplied during the other one of the first and second liquid replenishment time intervals by a multiple of between 1.05 and 2.0. In some implementations, it is desirable that a replenishment liquid material, that is more dilute in the dissolved carrier material, be supplied during one of the liquid replenishment time intervals in order to promote dissolution of any carrier material that may have precipitated onto the membrane 30 during the process.

In another aspect, there is provided a process for effecting separation of at least a gaseous permeate-disposed operative material from a gaseous supply material that is being supplied to a gaseous supply material receiving space that is disposed in mass transfer communication with a permeate receiving space through a membrane. The gaseous supply material includes an operative material that defines a gaseous supply material-disposed operative material. The membrane includes a gel. The process includes, while supplying the gaseous supply material to the gaseous supply material receiving space and effecting permeation of at least a separation fraction of the gaseous supply material-disposed operative material from the gaseous supply material receiving space, through the membrane, and into the permeate receiving space, wherein the permeation of at least a separation fraction of the gaseous supply material-disposed operative material to the permeate receiving space effects production of the gaseous permeate-disposed operative material, and wherein the permeation is effected in response to a differential in chemical potential of the operative material, as between the gaseous supply material receiving space and the permeate receiving space, wherein the effecting of the permeation of at least a separation fraction of the gaseous supply material-disposed operative material to the permeate receiving space includes effecting contacting of, or interaction between, at least a carrier-transported fraction of the gaseous supply material-disposed operative material and a carrier material that is dissolved within a liquid material that is disposed within the membrane gel, so as to effect association between the carrier-transported fraction and the carrier material. The at least a carrier-transported fraction of the gaseous supply material-disposed operative material is defined by at least a fraction of the at least a separation fraction of the gaseous supply material-disposed operative material. While the at least a carrier-transported fraction of the gaseous supply material-disposed operative material (defined by at least a fraction of the at least a separation fraction of the gaseous supply material-disposed operative material) is being transported through the membrane and towards the permeate receiving space, and during at least a fraction of (or, at least some of) the transporting of the at least a carrier-transported fraction of the gaseous supply material-disposed operative material through the membrane and towards the permeate receiving space, the at least a carrier-transported fraction of the gaseous supply material-disposed operative material is associated with the carrier material, periodically, effecting contacting of the membrane with a replenishment liquid material. The replenishment liquid material includes a replenishment liquid material-disposed carrier material that is dissolved within replenishment liquid material-disposed liquid material. The replenishment liquid material-disposed liquid material of the replenishment liquid material defines liquid material of the replenishment liquid material. The replenishment liquid material-disposed carrier material, which is dissolved within the replenishment liquid material-disposed liquid material, defines dissolved carrier material of the replenishment liquid material. In response to the contacting of the membrane with the replenishment liquid material, at least a fraction of the replenishment liquid material becomes disposed within the membrane gel. In some of these embodiments, for example, the minimum concentration of dissolved carrier material within the replenishment liquid material being supplied during at least one of the periods is greater than the maximum concentration of dissolved carrier material within the replenishment liquid material being supplied during at least another one of the periods. In some embodiments, for example, the minimum concentration of dissolved carrier material within the replenishment liquid material being supplied during at least one of the periods is greater than the maximum concentration of dissolved carrier material within the replenishment liquid material being supplied during at least another one of the periods by a multiple of between 1.05 and 2.0. In some implementations, it is desirable that a replenishment liquid material, that is more dilute in the dissolved carrier material, be supplied during at least one of the periods in order to promote dissolution of any carrier material that may have precipitated onto the membrane 30 during the process.

In another aspect, there is provided a process for effecting separation of at least a gaseous permeate-disposed operative material from a gaseous supply material that is being supplied to a gaseous supply material receiving space that is disposed in mass transfer communication with a permeate receiving space through a membrane. The gaseous supply material including an operative material that defines a gaseous supply material-disposed operative material. The membrane includes a gel. The process includes a repeating set of steps.

The repeating set of steps includes:

(a) supplying the gaseous supply material to the gaseous supply material receiving space and, while the supplying of the gaseous supply material to the gaseous supply material receiving space is being effected, effecting permeation of at least a separation fraction of the gaseous supply material-disposed operative material from the gaseous supply material receiving space, through the membrane, and into the permeate receiving space, wherein the permeation of at least a separation fraction of the gaseous supply material-disposed operative material to the permeate receiving space effects production of the gaseous permeate-disposed operative material, and wherein the permeation is effected in response to a differential in chemical potential (for example, defined by partial pressure) of the operative material, as between the gaseous supply material receiving space and the permeate receiving space, wherein the effecting of the permeation of at least a separation fraction of the gaseous supply material-disposed operative material to the permeate receiving space includes effecting contacting of, or interaction between, at least a carrier-transported fraction of the gaseous supply material-disposed operative material and a carrier material that is dissolved within a liquid material that is disposed within the membrane gel, so as to effect association between the carrier-transported fraction and the carrier material. The at least a carrier-transported fraction of the gaseous supply material-disposed operative material is defined by at least a fraction of the at least a separation fraction of the gaseous supply material-disposed operative material. While the at least a carrier-transported fraction of the gaseous supply material-disposed operative material (as defined by at least a fraction of the at least a separation fraction of the gaseous supply material-disposed operative material) is being transported through the membrane and towards the permeate receiving space, and during at least a fraction of (or, at least some of) the transporting of the at least a carrier-transported fraction of the gaseous supply material-disposed operative material through the membrane and towards the permeate receiving space, the at least a carrier-transported fraction of the gaseous supply material-disposed operative material is associated with the carrier material;

(b) suspending the supplying of the gaseous supply material to the gaseous supply material receiving space;

(c) after the suspension of the supplying of the gaseous supply material has been effected, effecting contacting of the membrane with a replenishment liquid material, wherein the replenishment liquid material includes a replenishment liquid material-disposed carrier material that is dissolved within replenishment liquid material-disposed liquid material, the replenishment liquid material-disposed liquid material of the replenishment liquid material defining liquid material of the replenishment liquid material, and the replenishment liquid material-disposed carrier material that is dissolved within the replenishment liquid material-disposed liquid material defining dissolved carrier material of the replenishment liquid material, such that, in response to the contacting of the membrane with the replenishment liquid material, at least a fraction of the replenishment liquid material becomes disposed within the membrane gel; and (d) suspending the effecting of the contacting of the membrane with a replenishment liquid material.

In some of these embodiments, for example, the repeating set of steps is completed at least twice such that at least two completed sets of steps are defined. The minimum concentration of dissolved carrier material within the replenishment liquid material being supplied during at least one of the at least two completed sets of steps is greater than the maximum concentration of dissolved carrier material within the replenishment liquid material being supplied during at least another one of the at least two completed sets of steps.

In some embodiments, for example, the minimum concentration of dissolved carrier material within the replenishment liquid material being supplied during at least one of the at least one of the at least two completed sets of steps is greater than the maximum concentration of dissolved carrier material within the replenishment liquid material being supplied during at least another one of the at least two completed sets of steps by a multiple of between 1.05 and 2.0. In some implementations, it is desirable that a replenishment liquid material, that is more dilute in the dissolved carrier material, be supplied during at least one of the completed sets of steps in order to promote dissolution of any carrier material that may have precipitated onto the membrane 30 during the process.

In some embodiments, for example, the contacting of the membrane 30 with the replenishment liquid material is effected for a time interval of between 1 second and 100 minutes. In some embodiments, for example, the contacting of the membrane 30 with the replenishment liquid material is effected for a time interval of between 10 seconds and 30 minutes. In some embodiments, for example, the contacting of the membrane 30 with the replenishment liquid material is effected for a time interval of between 15 second and 20 minutes.

In some embodiments, for example, the contacting of the membrane 30 with the replenishment liquid material is effected within the gaseous supply material receiving space 10. In some embodiments, for example, the contacting of the membrane with the replenishment liquid material is effected within the permeate receiving space 20. In some embodiments, for example, the contacting of the membrane with the replenishment liquid material is effected within both of the gaseous supply material receiving space 10 and the permeate receiving space 20. In some of these embodiments, for example, the contacting is effected by a stationary or stagnant soak by the replenishment liquid material.

In some embodiments, for example, while the contacting of the membrane 30 with the replenishment liquid material is being effected, supplying of the replenishment liquid material, for effecting the contacting with the membrane, is being effected. In some embodiments, for example, the supplying of the replenishment liquid material is effected to the gaseous supply material receiving space 10. In some embodiments, for example, the supplying of the replenishment liquid material is effected to the permeate receiving space 20. In some embodiments, for example, the supplying of the replenishment liquid material is effected to both of the gaseous supply material receiving space 10 and the permeate receiving space 20.

In some embodiments, for example, the process is effected within a membrane module 40, and the gaseous supply material receiving space 10 and the permeate receiving space 20 are defined by respective compartments 12, 22. In some of these embodiments, the supplying of the replenishment liquid material to either one or both of the gaseous supply material receiving compartment 12 and the permeate receiving compartment 22 is effected by flowing the replenishment liquid material in an upwardly direction. This effects improved contacting between the supplied replenishment liquid material and the membrane 30.

In some embodiments, for example, the replenishment liquid material is supplied to one of the gaseous supply material receiving space 10 and the permeate receiving space 20 such that transport is effected through the membrane 30 from the one of the gaseous supply material receiving space 10 and the permeate receiving space 20 to the other one of the gaseous supply material receiving space 10 and the permeate receiving space 20, and wherein the pressure within the other one of the gaseous supply material receiving space and the permeate receiving space is below atmospheric pressure. By effecting the transport of the replenishment liquid material through the membrane and into a space disposed below atmospheric pressure, condensation of the liquid material is mitigated. Such condensation effects backpressure on the membrane, interfering with the transfer (or permeation) of the separation fraction of the gaseous supply material-disposed operative material from the gaseous supply material receiving space to the permeate receiving space.

In some embodiments, for example, the replenishment liquid material includes an aqueous solution including a molar concentration of silver ion of at least 1.0. In some embodiments, for example, the replenishment liquid material includes an aqueous solution including a molar concentration of silver ion of between 2.0 and 10.0. In some embodiments, for example, the replenishment liquid material includes an aqueous solution including a molar concentration of silver ion of between 5.0 and 8.0. In some of these embodiments, for example, the membrane includes chitosan.

In some embodiments, for example, the liquid material is water, or includes water. In this respect, in some embodiments, for example, the carrier material is dissolved in water such that there is provided an aqueous solution including dissolved carrier material.

In some embodiments, for example, the replenishment liquid material includes between 10 and 90 weight % water, based on the total weight of the replenishment liquid material. In some embodiments, for example, the replenishment liquid material includes between 25 and 75 weight % water, based on the total weight of the replenishment liquid material. In some embodiments, for example, the replenishment liquid material includes between 30 and 50 weight % water, based on the total weight of the replenishment liquid material.

In some embodiments, for example, the liquid material of the replenishment liquid material may also include other additives, such as co-solvents and hygroscopic material.

In some embodiments, for example, the transferring of the separation fraction is effected while the temperature within each one of the gaseous supply receiving space and the permeate receiving space is between 5 degrees Celsius and 70 degrees Celsius. In some embodiments, for example, the transferring of the separation fraction is effected while the temperature within each one of the gaseous supply receiving space and the permeate receiving space is between 10 degrees Celsius and 60 degrees Celsius. In some embodiments, for example, the transferring of the separation fraction is effected while the temperature within each one of the gaseous supply receiving space and the permeate receiving space is between 15 degrees Celsius and 50 degrees Celsius.

In some embodiments, for example, the gaseous supply material has a relative humidity of between 0 and 100%. In some embodiments, for example, the gaseous supply material has a relative humidity of between 70 and 99%. In some embodiments, for example, the gaseous supply material has a relative humidity of between 95 and 99%.

In some embodiments, for example, the operative material includes at least one operative compound. In some of these embodiments, for example, the operative material-derived material includes at least one operative material-derived compound. For each one of the at least one operative material-derived compound, at least a fragment of the operative material-derived compound is derived from the operative material. Each one of the at least one operative material-derived compound includes at least a fragment of one or more operative compounds.

Figure 2:
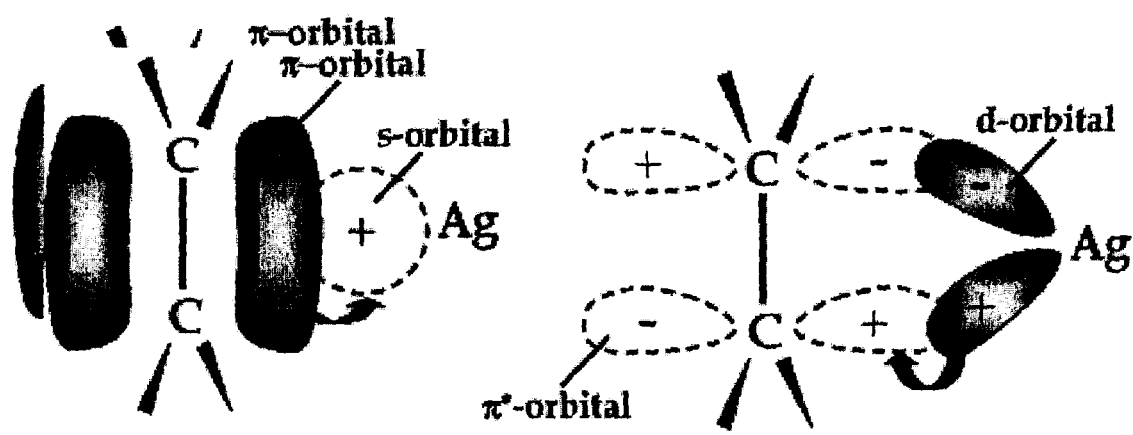
FIG. 2 is illustrative of the association effected in response to contacting of an olefin (ethylene) and a carrier material (silver ion).

In some embodiments, for example, a suitable operative compound is an olefin, and suitable olefins include ethylene, propylene, 1-butene, and 2-butene. FIG. 2 is illustrative of the association effected in response to contacting of an olefin (ethylene) and a carrier material (silver ion).

In some embodiments, for example, the operative material is defined by at least one operative compound, and the at least one operative compound is an olefin. In some embodiments, for example, each one of the at least one operative compound is an olefin.

In some embodiments, for example, the operative material is defined by at least one operative compound, and each one of the at least one operative compound is an olefin. In some embodiments, for example, the operative material is defined by at least one operative compound, and the at least one operative compound is a single operative compound, and the single operative compound is an olefin.

In some embodiments, for example, a suitable olefin is an olefin having a total number of carbon atoms of between two (2) and eight (8).

In some embodiments, for example, one or more of the olefins is an alpha olefin.

In some embodiments, for example, the carrier material includes at least one metal cation. In some embodiments, for example, the carrier material includes at least one of silver ion and cuprous ion. In some embodiments, for example, the carrier material includes silver ion. In this respect, in some embodiments, for example, the liquid material includes dissolved silver nitrate, and the carrier material includes the silver ion of the silver nitrate. In some of these embodiments, for example, the silver nitrate is dissolved in the liquid material such that there is provided an aqueous solution, that is included within the membrane gel, including dissolved silver nitrate. In some embodiments, for example, the membrane includes polymeric material, and the carrier material is complexed with, or chelated to, the polymeric material.

In some embodiments, for example, the membrane 30 includes polymeric material. In some of these embodiments, for example, the polymeric material includes at least one polymer compound. In some embodiments, for example, the at least one polymer compound is chitosan. In some embodiments, for example, each one of the at least one polymer compound is hydrophilic. In some embodiments, for example, each one of the at least one polymer compound has a number average molecular weight of between 20,000 and 1,000,000.

In some embodiments, for example, the membrane 30 includes polysaccharide. In this respect, in some embodiments, for example, the membrane includes one or more polysaccharides.

Suitable polysaccharides include natural polysaccharides such as alginic acid, pectic acid, chondroitin, hyaluronic acid and xanthan gum; cellulose, chitin, pullulan, derivatives of natural polysachharides such as $C_{1-6}$ esters, esters, ether and alkylcarboxy derivatives thereof, and phosphates of these natural polysaccharide such as partially methylesterified alginic acid, carbomethoxylated alginic acid, phosphorylated alginic acid and aminated alginic acid, salts of anionic cellulose derivatives such as carboxymethyl cellulose, cellulose sulfate, cellulose phosphate, sulfoethyl cellulose and phosphonoethyl cellulose, and semi-synthetic polysaccharides such as guar gum phosphate and chitin phosphate. Specific examples of membranes of polysaccharides include those composed of salts of chitosan and its derivatives (including salts of chitosan) such as N-acetylated chitosan, chitosan phosphate and carbomethoxylated chitosan. Of these, membranes composed of alginic acid, and salts and derivatives thereof, chitosan and salts and derivatives thereof cellulose and derivatives thereof (other than the mono-, di-, and tri-acetate derivatives thereof which are not intended to be included in the present invention) are preferred in view of their film-formability, mechanical strength and film functions.

In some embodiments, for example, the membrane 30 includes one or more polysaccharides, and also includes one or more other polymeric compounds. In this respect, in some embodiments, for example, the membranes is comprised of blends of a major amount (e.g. at least 60 weight %) of one or more polysaccharides and lesser amounts (e.g. up to 40 weight %) of one or more other compatible polymeric compounds, such as, for example, polyvinyl alcohol (PVA), or neutral polysaccharides such as starch and pullulan. In some embodiments, for example, the membrane is comprised of grafted ionized polysaccharides obtained by grafting a hydrophilic vinyl monomer such as acrylic acid.

In some embodiments, for example, the manufacturing of the membrane 30 includes casting a solution of polymeric material (such as one or more polysaccharides) as a film. In some embodiments, for example, the solution includes less than five (5) weight percent water, based on the total weight of solution. In some embodiments, for example, the solution includes less than two (2) weight percent water, based on the total weight of solution. In some embodiments, for example, the solution is an acidic aqueous solution. In some embodiments, the acid is an organic acid such as an organic acid having a total number of carbons of between one (1) and four (4). In some embodiments, for example, the acid includes acetic acid. In some embodiments, for example, the resulting solution may be cast as a film on a flat plate to effect production of a membrane intermediate. Suitable casting surfaces include glass or Teflon™ or the like (e.g. a smooth substrate to which the polymer film will have a low adhesion). The solution is then dried to form a film. In other embodiments, for example, the resulting solution may be cast as a film on a substrate material to effect production of a membrane intermediate supported on a substrate material. Suitable substrate material may itself be a film or a non-woven support, and can also be a hollow fiber substrate.

In some embodiments, for example, the membrane 30 includes chitosan.

Chitin may be deacetylated by treatment with hot alkali to effect production of chitosan. The polysaccharide may then be treated with a base to generate the protonated derivative ($NH_3^+$) or the unprotonated amino form ($NH_2$).

Chitosan is a generic term for deacetylation products of chitin obtained by treatment with concentrated alkalis. It is obtained by heating chitin, the principal constituent of shells of crustaceans such as lobsters and crabs to a temperature of at least 60.degree. C. together with an alkaline solution having an alkali concentration of 30 to 50% by weight (such as an aqueous solution of sodium hydroxide) and thereby deacetylating chitin. Chemically, chitosan is a linear polysaccharide composed of randomly distributed β-(1-4)-linked D-glucosamine (de-acetylated unit) and N-acetyl-D-glucosamine (acetylated unit). Chitosan readily dissolves in a dilute aqueous solution of an acid, such as acetic acid and hydrochloric acid, with the formation of a salt, but when contacted again with an aqueous alkaline solution, is again coagulated and precipitated. In some embodiments, for example, chitosan has a deacetylation degree of at least 50%, and in some of these embodiments, for example, chitosan has a deaccetylation degree of at least 75%.

An intermediate chitosan membrane can be obtained by dissolving chitosan in dilute aqueous acid solution, casting the solution as a film onto a flat plate to form a homogeneous chitosan fraction, or onto a substrate material (such as a hollow fibre substrate) to form a composite membrane. The cast film may then be contacted with an aqueous alkaline solution to neutralize the acidity and render it less soluble or substantially insoluble in water, or air-dried and then contacted with the aqueous alkaline solution.

To prepare the chitosan-type polysaccharide membrane, the amino groups of the intermediate composite membrane are at least partly neutralized with one or more acids to form an ammonium salt. Examples of suitable acids that can be utilized for neutralization include inorganic acids such as hydrochloric acid, hydrobromic acid, sulfuric acid and phosphoric acid; and organic acids such as acetic acid, methanesulfonic acid, formic acid, propionic acid, oxalic acid, malonic acid, succinic acid, fumaric acid, maleic acid, glutaric acid, phthalic acid, isophthalic acid, terephthaic acid, trimesic acid, trimellitic acid, citric acid, aconitic acid, sulfobenzoic acid, pyromellitic acid and ethylenediaminetetraacetic acid.

Protonation of the intermediate chitosan-type polysaccharide membrane using these acids can be effected, for example, by a method which comprises immersing the intermediate chitosan-type polysaccharide membrane in a solution containing the acid to ionize the amino groups in the membrane; or by a method which comprises subjecting the chitosan-type polysaccharide membrane to pervaporation with a mixed liquid containing the acid to convert the amino groups in the chitosan-type polysaccharide membrane successively to ammonium ions.

In some embodiments, for example, the membrane intermediate has a thickness from 0.5 to 20 microns, such as from three (3) to ten (10) microns, or such as from five (5) to eight (8) microns. In some embodiments, for example, the substrate material has a thickness from 30 to 200 microns, such as from 50 to 150 microns, or such as from 80 to 110 microns.

The membrane intermediate is then contacted with a salt of a metal cation (such as silver ion or cuprous ion). In some embodiments, for example, the contacting includes immersing the membrane intermediate in an aqueous solution including a salt of a metal cation (such as a 5 to 8 M aqueous silver nitrate soution). The contacting effects disposition of metal cations into (through chelation) and throughout the matrix of the membrane, and within its pores, and effects formation of a gel.

The membrane 30 can be embodied in any one of several configurations, including flat sheet, plate and frame, spiral wound, tubular, or hollow fibre.

In some embodiments, for example, the gaseous supply material further includes slower permeating material. The slower permeating material includes at least one slower permeating compound. A slower-permeating compound is a compound that is characterized by a lower permeability through the membrane 30 than that of each one of the at least one operative compound. Such lower permeability may be derived from its relatively lower diffusivity in the membrane, its relatively lower solubility in the membrane, or both.

In some embodiments, for example, the slower permeating compound has substantially no permeability through the membrane 30.

In some embodiments, for example, the transfer (or "permeation") of the at least a separation fraction of the gaseous supply material-disposed operative material is effected while at least one slower-permeating compound is transferring (or permeating) from the gaseous supply material receiving space 10, through the membrane 30 and into the permeate receiving space 20. For each one of the at least one operative compound of the at least a separation fraction of the gaseous supply material-disposed operative material there is provided an operative compound-associated operative ratio defined by the ratio of the molar rate of permeation of the operative compound to the mole fraction of the operative compound within the gaseous supply material receiving space, such that a plurality of operative compound-associated operative ratios are defined, and at least one of the plurality of operative compound-associated operative ratios is a minimum operative compound-associated operative ratio. For each one of the at least one transferring (or permeating) slower permeating compound, the ratio of the molar rate of permeation of the slower permeating compound to the mole fraction of the slower permeating compound within the gaseous supply material receiving space is less than the minimum operative compound-associated operative ratio, such that, for each one of the at least one operative compound, the molar concentration of the operative compound within a gaseous permeate, that is transferred (or permeated) from the gaseous supply receiving space, through the membrane, and into the permeate receiving space, is greater than the molar concentration of the operative compound within the gaseous supply material. In some embodiments, for example, while the transferring is being effected, the gaseous permeate is discharged from the permeate receiving space as the gaseous permeate product.

In some embodiments, for example, each one of the at least one slower permeating compound is a paraffin.

In some embodiments, for example, the at least one slower permeating compound is a single slower permeating compound, and the single slower permeating compound is a paraffin.

In some embodiments, for example, a suitable paraffin is a paraffin having a total number of carbon atoms of between one (1) and ten (10).

In the above description, for purposes of explanation, numerous details are set forth in order to provide a thorough understanding of the present disclosure. However, it will be apparent to one skilled in the art that these specific details are not required in order to practice the present disclosure. Although certain dimensions and materials are described for implementing the disclosed example embodiments, other suitable dimensions and/or materials may be used within the scope of this disclosure. All such modifications and variations, including all suitable current and future changes in technology, are believed to be within the sphere and scope of the present disclosure. All references mentioned are hereby incorporated by reference in their entirety.

The invention claimed is:

1. A process for effecting separation of at least a gaseous permeate-disposed operative material from a gaseous supply material that is being supplied to a gaseous supply material receiving space that is disposed in mass transfer communication with a permeate receiving space through a membrane, the gaseous supply material including a gaseous supply material-disposed operative material, and the membrane including a gel, comprising:

supplying the gaseous supply material to the gaseous supply material receiving space, and while the supplying of the gaseous supply material to the gaseous supply material receiving space is being effected, effecting permeation of at least a separation fraction of the gaseous supply material-disposed operative material from the gaseous supply material receiving space, through the membrane, and into the permeate receiving space, wherein the permeation of at least the separation fraction of the gaseous supply material-disposed operative material to the permeate receiving space effects production of the gaseous permeate-disposed operative material, and wherein the permeation is effected in response to a differential in chemical potential of the gaseous supply material-disposed operative material and the gaseous permeate-disposed operative material, as between the gaseous supply material receiving space and the permeate receiving space, and wherein the permeation includes transporting of a carrier-transported fraction of the gaseous supply material-disposed operative material through the membrane, wherein the carrier-transported fraction of the gaseous supply material-disposed operative material is defined by at least a fraction of the at least the separation fraction of the gaseous supply material-disposed operative material, and while the carrier-transported fraction of the gaseous supply material-disposed operative material is being transported through the membrane and towards the permeate receiving space, and during at least a fraction of the transporting of the carrier-transported fraction of the gaseous supply material-disposed operative material through the membrane and towards the permeate receiving space, the carrier-transported fraction of the gaseous supply material-disposed operative material is associated with a carrier material that is dissolved within a liquid material that is disposed within the membrane gel; and effecting contacting of the membrane with a replenishment liquid material, wherein the replenishment liquid material includes a replenishment liquid material-disposed carrier material that is dissolved within replenishment liquid material-disposed liquid material, such that, in response to the contacting of the membrane with the replenishment liquid material, at least a fraction of the replenishment liquid material becomes disposed within the membrane gel;

wherein the effecting of the contacting of the membrane with a replenishment liquid material is effected while the supplying of the gaseous supply material to the gaseous supply material receiving space is being effected;

wherein the effecting of the contacting of the membrane with the replenishment liquid material is periodic, such that the minimum concentration of dissolved carrier material within the replenishment liquid material being supplied during at least one of the periods is greater than the maximum concentration of dissolved carrier material within the replenishment liquid material being supplied during at least another one of the periods.

2. The process as claimed in claim 1, wherein the effecting of the contacting of the membrane with a replenishment liquid material is effected after the supplying of the gaseous supply material to the gaseous supply material receiving space has been suspended.

3. The process as claimed in claim 1, wherein the membrane includes a polysaccharide.

4. The process as claimed in claim 1, wherein the membrane includes chitosan.

5. The process as claimed in claim 1, wherein the operative material includes an olefin.

6. The process as claimed in claim 1, wherein the carrier material that is dissolved within the liquid material that is disposed within the membrane gel includes at least one metal cation, and wherein the replenishment liquid material-disposed carrier material includes at least one metal cation.

7. The process as claimed in claim 1, wherein the carrier material that is dissolved within the liquid material that is disposed within the membrane gel includes at least one of silver ion and copper ion, and wherein the replenishment liquid material-disposed carrier material includes at least one of silver ion and copper ion.

8. The process as claimed in claim 1, wherein the liquid material that is disposed within the membrane gel includes water, and wherein the replenishment liquid material-disposed liquid material includes water.

9. The process as claimed in claim 1, wherein the effecting of the contacting of the membrane with a replenishment liquid material is effected after at least a fraction of the liquid material, which is disposed within the membrane gel, becomes depleted.

10. The process as claimed in claim 1, as effected within a membrane module, wherein the gaseous supply material receiving space and the permeate receiving space are defined by respective compartments, wherein the supplying of the replenishment liquid material to either one or both of the gaseous supply material receiving compartment and the permeate receiving compartment, for the effecting of the contacting of the membrane with a replenishment liquid material, is effected by flowing the replenishment liquid material in an upwardly direction.

11. The process as claimed in claim 1 wherein the replenishment liquid material is supplied to one of the gaseous supply material receiving space and the permeate receiving space such that transport is effected through the membrane from the one of the gaseous supply material receiving space and the permeate receiving space to the other one of the gaseous supply material receiving space and the permeate receiving space, and wherein the pressure within the other one of the gaseous supply material receiving space and the permeate receiving space is below atmospheric pressure.

12. The process as claimed in claim 1, wherein the membrane includes a polysaccharide, and the replenishment liquid material includes an aqueous solution including a molar concentration of silver ion of at least 1.0.

13. The process as claimed in claim 1, wherein the replenishment liquid material includes between 10 and 90 weight % water, based on the total weight of the replenishment liquid material.

14. The process as claimed in claim 1, wherein the permeation of the at least the separation fraction of the gaseous supply material-disposed operative material is effected while at least one slower-permeating compound is permeating from the gaseous supply material receiving space, through the membrane, and into the permeate receiving space.

15. The process as claimed in claim 14 wherein, while the permeating is being effected, a gaseous permeate is discharged from the permeate receiving space as a gaseous permeate product.

16. The process as claimed in claim 14, wherein each one of the at least one slower permeating compound is a paraffin.

17. The process as claimed in claim 1, wherein the membrane includes polymeric material, and the carrier material is complexed with the polymeric material.

18. The process as claimed in claim 1, wherein the membrane includes polymeric material, and the carrier material is chelated to the polymeric material.

19. A process for effecting separation of at least a gaseous permeate-disposed operative material from a gaseous supply material that is being supplied to a gaseous supply material receiving space that is disposed in mass transfer communication with a permeate receiving space through a membrane, the gaseous supply material including a gaseous supply material-disposed operative material, and wherein the membrane includes a gel, comprising:
while supplying the gaseous supply material to the gaseous supply material receiving space and effecting permeation of at least a separation fraction of the gaseous supply material-disposed operative material from the gaseous supply material receiving space, through the membrane, and into the permeate receiving space, wherein the permeation of at least the separation fraction of the gaseous supply material-disposed operative material to the permeate receiving space effects production of the gaseous permeate-disposed operative material, and wherein the permeation is effected in response to a differential in chemical potential of the gaseous supply material-disposed operative material and the gaseous permeate-disposed operative material, as between the gaseous supply material receiving space and the permeate receiving space, and wherein the permeation includes transporting of a carrier-transported fraction of the gaseous supply material-disposed operative material through the membrane, wherein the carrier-transported fraction of the gaseous supply material-disposed operative material is defined by at least a fraction of the at least the separation fraction of the gaseous supply material-disposed operative material, and while the carrier-transported fraction of the gaseous supply material-disposed operative material is being transported through the membrane and towards the permeate receiving space, and during at least a fraction of the transporting of the carrier-transported fraction of the gaseous supply material-disposed operative material through the membrane and towards the permeate receiving space, the carrier-transported fraction of the gaseous supply material-disposed operative material is associated with a carrier material that is dissolved within a liquid material that is disposed within the membrane gel, periodically, effecting contacting of the membrane with a replenishment liquid material, wherein the replenishment liquid material includes a replenishment liquid material-disposed carrier material that is dissolved within replenishment liquid material-disposed liquid material, such that, in response to the contacting of the membrane with the replenishment liquid material, at least a fraction of the replenishment liquid material becomes disposed within the membrane gel;
wherein the minimum concentration of dissolved carrier material within the replenishment liquid material being supplied during at least one of the periods is greater than the maximum concentration of dissolved carrier material within the replenishment liquid material being supplied during at least another one of the periods.

20. The process as claimed in claim 19, wherein the membrane includes a polysaccharide.

21. The process as claimed in claim 19, wherein the membrane includes chitosan.

22. The process as claimed in claim 19, wherein the operative material includes an olefin.

23. The process as claimed in claim 19, wherein the carrier material that is dissolved within the liquid material that is disposed within the membrane gel includes at least one metal cation, and wherein the replenishment liquid material-disposed carrier material includes at least one metal cation.

24. The process as claimed in claim 19, wherein the carrier material that is dissolved within the liquid material that is disposed within the membrane gel includes at least one of silver ion and copper ion, and wherein the replenishment liquid material-disposed carrier material includes at least one of silver ion and copper ion.

25. The process as claimed in claim 19, wherein the liquid material that is disposed within the membrane gel includes water, and wherein the replenishment liquid material-disposed liquid material includes water.

26. The process as claimed in claim 19, wherein the effecting of the contacting of the membrane with a replenishment liquid material is effected after at least a fraction of the liquid material, which is disposed within the membrane gel, becomes depleted.

27. The process as claimed in claim 19, as effected within a membrane module, wherein the gaseous supply material receiving space and the permeate receiving space are defined by respective compartments, wherein the supplying of the replenishment liquid material to either one or both of the gaseous supply material receiving compartment and the permeate receiving compartment, for the effecting of the contacting of the membrane with a replenishment liquid material, is effected by flowing the replenishment liquid material in an upwardly direction.

28. The process as claimed in claim 19, wherein the replenishment liquid material is supplied to one of the gaseous supply material receiving space and the permeate receiving space such that transport is effected through the membrane from the one of the gaseous supply material receiving space and the permeate receiving space to the other one of the gaseous supply material receiving space and the permeate receiving space, and wherein the pressure within the other one of the gaseous supply material receiving space and the permeate receiving space is below atmospheric pressure.

29. The process as claimed in claim 19, wherein the membrane includes a polysaccharide, and the replenishment liquid material includes an aqueous solution including a molar concentration of silver ion of at least 1.0.

30. The process as claimed in claim 19, wherein the replenishment liquid material includes between 10 and 90 weight % water, based on the total weight of the replenishment liquid material.

31. The process as claimed in claim 19, wherein the permeation of the at least the separation fraction of the gaseous supply material-disposed operative material is effected while at least one slower-permeating compound is permeating from the gaseous supply material receiving space, through the membrane, and into the permeate receiving space.

32. The process as claimed in claim 31, wherein, while the permeating is being effected, a gaseous permeate is discharged from the permeate receiving space as a gaseous permeate product.

33. The process as claimed in claim 31, wherein each one of the at least one slower permeating compound is a paraffin.

34. The process as claimed in claim 19, wherein the membrane includes polymeric material, and the carrier material is complexed with the polymeric material.

35. The process as claimed in claim 19, wherein the membrane includes polymeric material, and the carrier material is chelated to the polymeric material.

36. A process for effecting separation of at least a gaseous permeate-disposed operative material from a gaseous supply material that is being supplied to a gaseous supply material receiving space that is disposed in mass transfer communication with a permeate receiving space through a membrane, the gaseous supply material including a gaseous supply material-disposed operative material, and the membrane including a gel, comprising:

supplying the gaseous supply material to the gaseous supply material receiving space, and while the supplying of the gaseous supply material to the gaseous supply material receiving space is being effected, effecting permeation of at least a separation fraction of the gaseous supply material-disposed operative material from the gaseous supply material receiving space, through the membrane, and into the permeate receiving space, wherein the permeation of at least the separation fraction of the gaseous supply material-disposed operative material to the permeate receiving space effects production of the gaseous permeate-disposed operative material, and wherein the permeation is effected in response to a differential in chemical potential of the gaseous supply material-disposed operative material and the gaseous permeate-disposed operative material, as between the gaseous supply material receiving space and the permeate receiving space, and wherein the permeation includes transporting of a carrier-transported fraction of the gaseous supply material-disposed operative material through the membrane, wherein the carrier-transported fraction of the gaseous supply material-disposed operative material is defined by at least a fraction of the at least the separation fraction of the gaseous supply material-disposed operative material, and while the carrier-transported fraction of the gaseous supply material-disposed operative material is being transported through the membrane and towards the permeate receiving space, and during at least a fraction of the transporting of the carrier-transported fraction of the gaseous supply material-disposed operative material through the membrane and towards the permeate receiving space, the carrier-transported fraction of the gaseous supply material-disposed operative material is associated with a carrier material that is dissolved within a liquid material that is disposed within the membrane gel; and effecting contacting of the membrane with a replenishment liquid material, wherein the replenishment liquid material includes a replenishment liquid material-disposed carrier material that is dissolved within replenishment liquid material-disposed liquid material, such that, in response to the contacting of the membrane with the replenishment liquid material, at least a fraction of the replenishment liquid material becomes disposed within the membrane gel;

wherein the effecting of the contacting of the membrane with a replenishment liquid material is effected in response to sensing that at least a fraction of the liquid material, which is disposed within the membrane gel, becomes depleted.

37. The process as claimed in claim 36, wherein the effecting of the contacting of the membrane with a replenishment liquid material is effected after the supplying of the gaseous supply material to the gaseous supply material receiving space has been suspended.

38. The process as claimed in claim 36, wherein the membrane includes a polysaccharide.

39. The process as claimed in claim 36, wherein the membrane includes chitosan.

40. The process as claimed in claim 36, wherein the operative material includes an olefin.

41. The process as claimed in claim 36, wherein the carrier material that is dissolved within the liquid material that is disposed within the membrane gel includes at least one metal cation, and wherein the replenishment liquid material-disposed carrier material includes at least one metal cation.

42. The process as claimed in claim 36, wherein the carrier material that is dissolved within the liquid material that is disposed within the membrane gel includes at least one of silver ion and copper ion, and wherein the replenishment liquid material-disposed carrier material includes at least one of silver ion and copper ion.

43. The process as claimed in claim 36, wherein the liquid material that is disposed within the membrane gel includes water, and wherein the replenishment liquid material-disposed liquid material includes water.

44. The process as claimed in claim 36, wherein the effecting of the contacting of the membrane with a replenishment liquid material is effected after at least a fraction of the liquid material, which is disposed within the membrane gel, becomes depleted.

45. The process as claimed in claim 36, as effected within a membrane module, wherein the gaseous supply material receiving space and the permeate receiving space are defined by respective compartments, wherein the supplying of the replenishment liquid material to either one or both of the gaseous supply material receiving compartment and the permeate receiving compartment, for the effecting of the contacting of the membrane with a replenishment liquid material, is effected by flowing the replenishment liquid material in an upwardly direction.

46. The process as claimed in claim 36 wherein the replenishment liquid material is supplied to one of the gaseous supply material receiving space and the permeate receiving space such that transport is effected through the membrane from the one of the gaseous supply material receiving space and the permeate receiving space to the other one of the gaseous supply material receiving space and the permeate receiving space, and wherein the pressure within the other one of the gaseous supply material receiving space and the permeate receiving space is below atmospheric pressure.

47. The process as claimed in claim 36, wherein the membrane includes a polysaccharide, and the replenishment liquid material includes an aqueous solution including a molar concentration of silver ion of at least 1.0.

48. The process as claimed in claim 36, wherein the replenishment liquid material includes between 10 and 90 weight % water, based on the total weight of the replenishment liquid material.

49. The process as claimed in claim 36, wherein the permeation of the at least the separation fraction of the gaseous supply material-disposed operative material is effected while at least one slower-permeating compound is permeating from the gaseous supply material receiving space, through the membrane, and into the permeate receiving space.

50. The process as claimed in claim 49 wherein, while the permeating is being effected, a gaseous permeate is discharged from the permeate receiving space as a gaseous permeate product.

51. The process as claimed in claim 49, wherein each one of the at least one slower permeating compound is a paraffin.

52. The process as claimed in claim 36, wherein the membrane includes polymeric material, and the carrier material is complexed with the polymeric material.

53. The process as claimed in claim 36, wherein the membrane includes polymeric material, and the carrier material is chelated to the polymeric material.

54. A process for effecting separation of at least a gaseous permeate-disposed operative material from a gaseous supply material that is being supplied to a gaseous supply material receiving space that is disposed in mass transfer communication with a permeate receiving space through a membrane, the gaseous supply material including a gaseous supply material-disposed operative material, and wherein the membrane includes a gel, comprising:

while supplying the gaseous supply material to the gaseous supply material receiving space and effecting permeation of at least a separation fraction of the gaseous supply material-disposed operative material from the gaseous supply material receiving space, through the membrane, and into the permeate receiving space, wherein the permeation of at least the separation fraction of the gaseous supply material-disposed operative material to the permeate receiving space effects production of the gaseous permeate-disposed operative material, and wherein the permeation is effected in response to a differential in chemical potential of the gaseous supply material-disposed operative material and the gaseous permeate-disposed operative material, as between the gaseous supply material receiving space and the permeate receiving space, and wherein the permeation includes transporting of a carrier-transported fraction of the gaseous supply material-disposed operative material through the membrane, wherein the carrier-transported fraction of the gaseous supply material-disposed operative material is defined by at least a fraction of the at least the separation fraction of the gaseous supply material-disposed operative material, and while the carrier-transported fraction of the gaseous supply material-disposed operative material is being transported through the membrane and towards the permeate receiving space, and during at least a fraction of the transporting of the carrier-transported fraction of the gaseous supply material-disposed operative material through the membrane and towards the permeate receiving space, the carrier-transported fraction of the gaseous supply material-disposed operative material is associated with a carrier material that is dissolved within a liquid material that is disposed within the membrane gel, periodically, effecting contacting of the membrane with a replenishment liquid material, wherein the replenishment liquid material includes a replenishment liquid material-disposed carrier material that is dissolved within replenishment liquid material-disposed liquid material, such that, in response to the contacting of the membrane with the replenishment liquid material, at least a fraction of the replenishment liquid material becomes disposed within the membrane gel;

wherein the effecting of the contacting of the membrane with the replenishment liquid material is effected in response to sensing that at least a fraction of the liquid material, which is disposed within the membrane gel, becomes depleted.

55. The process as claimed in claim 54, wherein the membrane includes a polysaccharide.

56. The process as claimed in claim 54, wherein the membrane includes chitosan.

57. The process as claimed in claim 54, wherein the operative material includes an olefin.

58. The process as claimed in claim 54, wherein the carrier material that is dissolved within the liquid material that is disposed within the membrane gel includes at least one metal cation, and wherein the replenishment liquid material-disposed carrier material includes at least one metal cation.

59. The process as claimed in claim 54, wherein the carrier material that is dissolved within the liquid material that is disposed within the membrane gel includes at least one of silver ion and copper ion, and wherein the replenishment liquid material-disposed carrier material includes at least one of silver ion and copper ion.

60. The process as claimed in claim 54, wherein the liquid material that is disposed within the membrane gel includes water, and wherein the replenishment liquid material-disposed liquid material includes water.

61. The process as claimed in claim 54, wherein the effecting of the contacting of the membrane with a replenishment liquid material is effected after at least a fraction of the liquid material, which is disposed within the membrane gel, becomes depleted.

62. The process as claimed in claim 54, as effected within a membrane module, wherein the gaseous supply material receiving space and the permeate receiving space are defined by respective compartments, wherein the supplying of the replenishment liquid material to either one or both of the gaseous supply material receiving compartment and the permeate receiving compartment, for the effecting of the contacting of the membrane with a replenishment liquid material, is effected by flowing the replenishment liquid material in an upwardly direction.

63. The process as claimed in claim 54, wherein the replenishment liquid material is supplied to one of the gaseous supply material receiving space and the permeate receiving space such that transport is effected through the membrane from the one of the gaseous supply material receiving space and the permeate receiving space to the other one of the gaseous supply material receiving space and the permeate receiving space, and wherein the pressure within the other one of the gaseous supply material receiving space and the permeate receiving space is below atmospheric pressure.

64. The process as claimed in claim 54, wherein the membrane includes a polysaccharide, and the replenishment liquid material includes an aqueous solution including a molar concentration of silver ion of at least 1.0.

65. The process as claimed in claim 54, wherein the replenishment liquid material includes between 10 and 90 weight % water, based on the total weight of the replenishment liquid material.

66. The process as claimed in claim 54, wherein the permeation of the at least the separation fraction of the gaseous supply material-disposed operative material is effected while at least one slower-permeating compound is permeating from the gaseous supply material receiving space, through the membrane, and into the permeate receiving space.

67. The process as claimed in claim 66, wherein, while the permeating is being effected, a gaseous permeate is discharged from the permeate receiving space as a gaseous permeate product.

68. The process as claimed in claim 66, wherein each one of the at least one slower permeating compound is a paraffin.

69. The process as claimed in claim 54, wherein the membrane includes polymeric material, and the carrier material is complexed with the polymeric material.

70. The process as claimed in claim 54, wherein the membrane includes polymeric material, and the carrier material is chelated to the polymeric material.

* * * * *